United States Patent
Ratajczak et al.

(10) Patent No.: US 9,038,628 B2
(45) Date of Patent: May 26, 2015

(54) SYSTEM AND METHOD FOR AN OXYGEN SYSTEM ALARM

(75) Inventors: John A. Ratajczak, Lancaster, NY (US); Danko A. Kobziar, Williamsville, NY (US)

(73) Assignee: AVOX SYSTEMS INC., Lancaster, NY (US)

( * ) Notice: Subject to any disclaimer, the term of this patent is extended or adjusted under 35 U.S.C. 154(b) by 598 days.

(21) Appl. No.: 13/415,948

(22) Filed: Mar. 9, 2012

(65) Prior Publication Data

US 2013/0133647 A1 May 30, 2013

Related U.S. Application Data

(60) Provisional application No. 61/565,483, filed on Nov. 30, 2011.

(51) Int. Cl.
| | | |
|---|---|---|
| A62B 7/00 | (2006.01) |
| A62B 7/14 | (2006.01) |
| A61M 16/00 | (2006.01) |
| B64D 13/00 | (2006.01) |
| B64D 10/00 | (2006.01) |

(52) U.S. Cl.
CPC ... *A62B 7/14* (2013.01); *A62B 7/00* (2013.01); *B64D 10/00* (2013.01); *B64D 2231/02* (2013.01)

(58) Field of Classification Search
CPC .... A62B 7/14; A62B 7/00; B64D 2013/0677; B64D 2013/0681; B64D 2230/00; B64D 2230/02; B64D 10/00
USPC ............ 128/202.22, 202.26, 204.18, 204.21, 128/204.22, 201.29
See application file for complete search history.

(56) References Cited

U.S. PATENT DOCUMENTS

| | | | |
|---|---|---|---|
| 4,109,509 A | | 8/1978 | Cramer et al. |
| 4,198,213 A | * | 4/1980 | Mannatt ............................ 95/54 |
| 4,282,870 A | * | 8/1981 | Porlier ..................... 128/203.14 |
| 4,567,909 A | | 2/1986 | Schebler et al. |
| 4,687,013 A | | 8/1987 | Stevenson |
| 4,783,205 A | | 11/1988 | Searle |
| 4,919,124 A | | 4/1990 | Stevenson et al. |
| 5,004,485 A | | 4/1991 | Hamlin et al. |
| 5,022,393 A | | 6/1991 | McGrady et al. |
| 5,071,453 A | | 12/1991 | Hradek et al. |
| 5,357,949 A | * | 10/1994 | Bertheau et al. ......... 128/204.29 |

(Continued)

FOREIGN PATENT DOCUMENTS

| | | |
|---|---|---|
| EP | 0423496 | 7/1994 |
| JP | 4138174 | 9/1990 |

*Primary Examiner* — Justine Yu
*Assistant Examiner* — Douglas Sul
(74) *Attorney, Agent, or Firm* — Hodgson Russ LLP

(57) ABSTRACT

The present invention may be embodied as a system and/or a computer-based method for determining safe operation of a breathing gas system comprising the step of receiving a present oxygen concentration value from an oxygen concentration sensor. The method further comprises the step of receiving, at the computer, a present altitude value from an altimeter of the aircraft and using the computer to calculate an alarm flow rate, where the alarm flow rate is a function of the present oxygen concentration value and the present altitude value. The method may further comprise the step of receiving, at the computer, a present flow value from a flow meter, where the present flow value represents the rate of flow of breathing gas to the user. The method may comprise the step of comparing the calculated alarm flow rate to the received present flow value to determine a safe operation of the oxygen system.

15 Claims, 6 Drawing Sheets

(56) References Cited

U.S. PATENT DOCUMENTS

| | | |
|---|---|---|
| 5,682,877 A | 11/1997 | Mondry |
| 6,712,876 B2 | 3/2004 | Cao et al. |
| 6,789,539 B2 * | 9/2004 | Martinez ................. 128/204.26 |
| 7,550,036 B2 | 6/2009 | Lee et al. |
| 7,584,753 B2 | 9/2009 | Aubonnet et al. |
| 7,837,761 B2 | 11/2010 | Bliss et al. |
| 2009/0167698 A1 | 7/2009 | Altas et al. |
| 2009/0277449 A1 * | 11/2009 | Bloch et al. .............. 128/204.22 |

* cited by examiner

|     | 10  | 12.5 | 16  | 17.5 | 20  | 22.5 | 25  |
| --- | --- | --- | --- | --- | --- | --- | --- |
| 40  | 4.8 | 5.2 | 6.0 | 6.4 | 6.8 | 7.0 | 6.7 |
| 45  | 4.6 | 5.1 | 6.0 | 6.3 | 6.7 | 6.8 | 6.6 |
| 50  | 4.4 | 5.0 | 5.8 | 6.2 | 6.5 | 6.7 | 6.5 |
| 55  | 4.2 | 4.9 | 5.7 | 6.0 | 6.4 | 6.5 | 6.4 |
| 60  | 4.1 | 4.8 | 5.6 | 5.9 | 6.3 | 6.4 | 6.3 |
| 65  | 3.9 | 4.7 | 5.5 | 5.8 | 6.1 | 6.3 | 6.2 |
| 70  | 3.8 | 4.6 | 5.4 | 5.6 | 6.0 | 6.1 | 6.1 |
| 75  | 3.8 | 4.5 | 5.3 | 5.5 | 5.8 | 6.0 | 6.0 |
| 80  | 3.7 | 4.4 | 5.1 | 5.4 | 5.6 | 5.8 | 5.9 |
| 85  | 3.7 | 4.3 | 5.0 | 5.2 | 5.5 | 5.7 | 5.8 |
| 90  | 3.7 | 4.2 | 4.8 | 5.0 | 5.3 | 5.5 | 5.7 |
| 95  | 3.7 | 4.2 | 4.7 | 4.9 | 5.2 | 5.4 | 5.6 |
| 100 | 3.8 | 4.1 | 4.5 | 4.7 | 5.0 | 5.2 | 5.4 |

Fig. 7

SYSTEM AND METHOD FOR AN OXYGEN SYSTEM ALARM

CROSS-REFERENCE TO RELATED APPLICATION

This application claims the benefit of priority to U.S. provisional patent application Ser. No. 61/565,483, filed on Nov. 30, 2011, the disclosure of which is incorporated herein by reference.

FIELD OF THE INVENTION

The invention relates to oxygen systems and on-board oxygen generation systems for aircraft.

BACKGROUND OF THE INVENTION

Oxygen systems and on-board oxygen generation systems (hereinafter "oxygen systems") are in widespread use for providing oxygen and oxygen enriched breathing gas (hereinafter "breathing gas"), respectively, to occupants of the aircraft. Sufficient breathing gas must be provided to the occupants (also referred to herein as "users" of the disclosed systems and methods) such that the occupants to not develop hypoxia—a condition where the body is deprived of adequate oxygen. The oxygen level of a person may be determined by measuring the level of oxygen in the blood of that person. This is also known as the blood oxygen saturation.

Competing with the need to provide occupants with sufficient breathing gas is the need to efficiently utilize the available space and lift capabilities of the aircraft. For this reason, the supply of oxygen (or oxygen precursors) loaded onto the aircraft may be limited to the amount projected as necessary. Similarly, it is important to make efficient use of the available breathing gas-supplying capabilities of the oxygen system(s) by not over supplying breathing gas to the user of that system (also referred to herein as an oxygen system). For this reason, oxygen systems have previously been provided to provide a quantity of breathing gas to the user(s) according to the altitude of the aircraft. As the altitude increases, so does the demand for supplemental breathing gas. In this way, the use of breathing gas is more efficient, especially at lower altitudes. However, there remains the need to drive further efficiencies from the oxygen systems.

BRIEF SUMMARY OF THE INVENTION

Accordingly, the present invention provides systems and methods for determining the breathing gas needs which is a function of both altitude and the concentration of oxygen of the breathing gas. In this way, safe operation of oxygen systems on small, unpressurized aircraft may be determined by monitoring the oxygen concentration and flow as a function of the altitude. The safe threshold of breathing gas flow is thus a function of oxygen concentration and altitude, and the function may be depicted as a threshold surface which is a three-dimensional curved surface. This minimum allowable flow surface is used to compare the in-flight calculation of the actual values and determine acceptable safe operating conditions for the users of the oxygen system. This alarm surface may be used with pressure swing adsorption (PSA), pressure swing vacuum swing adsorption (PSA/VSA) processes of on-board oxygen generation systems used for small, unpressurized aircraft, and may also be used for any type of mask or oxygen delivery system.

This alarm surface and calculation allows for more efficient use of breathing gas on-board an aircraft. This methodology enables the safe use of oxygen systems at varying breathing gas flows and oxygen concentrations in hypobaric and hyperbaric environments. It allows two of the factors, flow and oxygen concentration, to vary up or down independently. The values are compared to a calculated threshold surface to determine if the combination of the values is safe for the particular altitude at which aircraft is being flown. An exemplary base surface was created by using clinical data to formulate the safe alarm surface by adjusting the formula to match the clinical data.

The present invention may be embodied as a computer-based method for determining safe operation of a breathing gas system comprising the step of receiving a present oxygen concentration value from an oxygen concentration sensor. The method further comprises the step of receiving, at the computer, a present altitude value from an altimeter of the aircraft and using the computer to calculate an alarm flow rate, where the alarm flow rate is a function of the present oxygen concentration value and the present altitude value. The method may further comprise the step of receiving, at the computer, a present flow value from a flow meter, where the present flow value represents the rate of flow of breathing gas to the user. The method may further comprise the step of comparing the calculated alarm flow rate to the received present flow value to determine a safe operation of the oxygen system.

The method may further comprise generating an alarm, sending an electrical signal to the oxygen system to adjust the flow rate of breathing gas, and/or sending an electrical signal to the oxygen system to adjust the oxygen concentration within the flow of breathing gas.

The steps of method may repeat while the oxygen system of an aircraft is in use in order to monitor and adjust the breathing gas provided to the user.

The present invention may be embodied as a system for determining safe operation of an oxygen system on an aircraft, comprising a computer in electrical communication with an oxygen concentration sensor, an altimeter, and a flow meter. The computer of such a system is programmed to perform any of the methods of the present disclosure.

The present invention may be embodied as an oxygen system for an aircraft, comprising a processor and an oxygen generator in communication with the processor. As contemplated herein, computers, processors, controllers, and the like may be used interchangeably. The oxygen system further comprises an oxygen concentration sensor and a flow meter, each in electrical communication with the processor. The processor is programmed with any of the methods of the present disclosure.

DESCRIPTION OF THE DRAWINGS

For a fuller understanding of the nature and objects of the invention, reference should be made to the following detailed description taken in conjunction with the accompanying drawings, in which:

FIG. 7 is a chart of the data of FIG. 6;

DETAILED DESCRIPTION OF THE INVENTION

Figure 1:
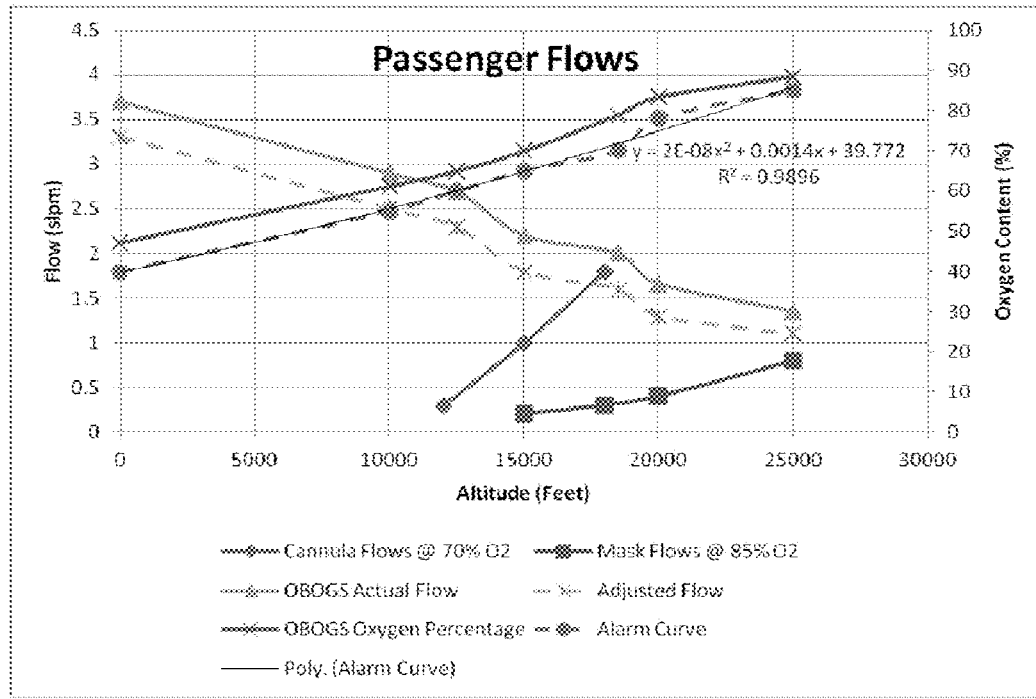
FIG. 1 is a graph showing passenger related test data measured in developing an exemplary function for use in embodiments of the present invention.

The present invention may be embodied as a method 100 for determining safe operation of an oxygen system (see, e.g., FIG. 1). Such oxygen systems are often used in aircraft to provide breathing gas to occupants of the aircraft. The oxygen systems can be used for respiration during emergency and/or non-emergency situations. Oxygen systems can vary in flow rate and/or oxygen concentration of the delivered gas in order to provide an appropriate level of breathing gas available to a user, or user(s), of the oxygen system.

The method 100 is used with a computerized alarm system. The method 100 comprises the step of receiving 103 a present oxygen concentration value of a fluid delivery system in the aircraft. The present oxygen concentration value is measured by an oxygen concentration sensor. The oxygen concentration sensor is configured to measure the concentration of oxygen in a gas mixture and produce an electrical signal corresponding to the concentration of oxygen in the gas mixture. The measured value may be an instantaneous concentration. In other embodiments, the value may represent an average concentration over a period of time. The measurement may be made continually at a sampling rate. The oxygen concentration sensor is in electrical communication with the computerized alarm system, and is configured to send the electrical signal representing the value of oxygen concentration to the computerized alarm system. In this way, the oxygen concentration sensor sends the present oxygen concentration value to the computerized alarm system, and the value is received 103 by the computerized alarm system.

The method 100 further comprises the step of receiving 106 a present altitude value from an altimeter of the aircraft. Altimeters are widely used in aircraft to determine the present altitude of the aircraft. The measurement may be made continually at a sampling rate, which may or may not be the same as the oxygen sensor sampling rate. The altimeter is in electrical communication with the computerized alarm system. The altimeter is configured to send an electrical signal representing the altitude of the aircraft to the computerized alarm system. In this way, the altimeter sends the present altitude value to the computerized alarm system, and the value is received 106 by the computerized alarm system.

Figure 6:
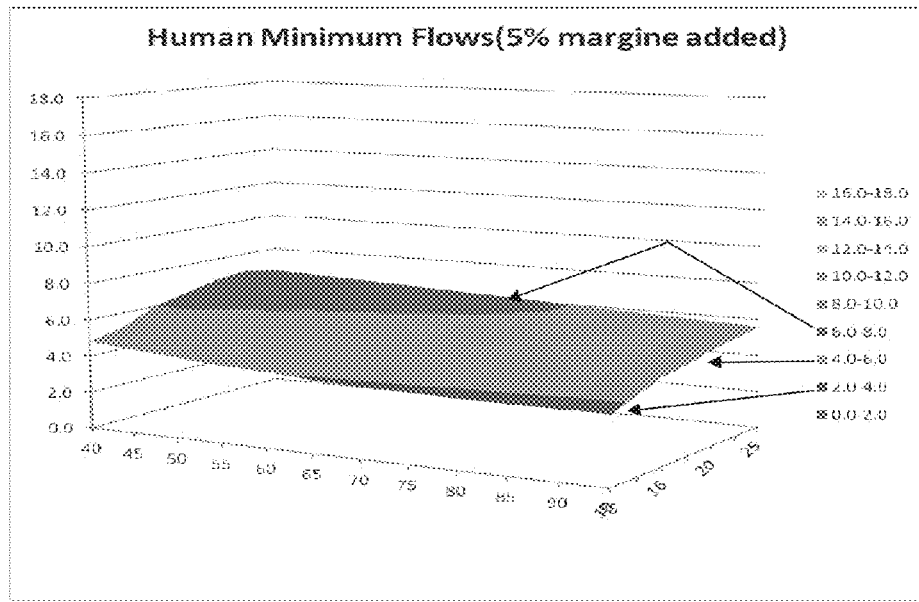
FIG. 6 is a three-dimensional graph showing the exemplary function of alarm flow
Figure 8:
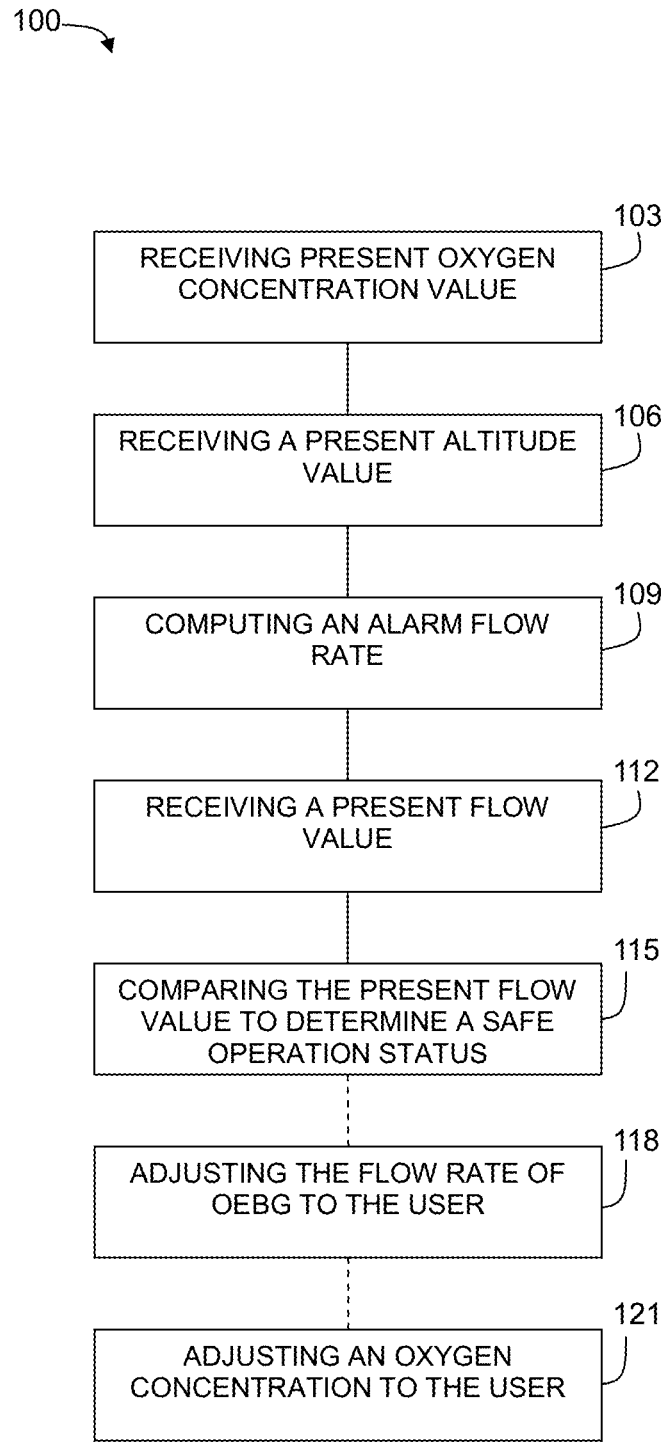
FIG. 8 is a flowchart showing a method according to an embodiment of the present invention.

The method 100 further comprises the step of computing 109 an alarm flow rate. The alarm flow rate is a threshold value representing a safe flow of breathing gas needed for survival of the user at a particular altitude and a particular oxygen concentration. Such a threshold value may be considered as a surface threshold, where each location on the surface represents a threshold flow rate of breathing gas necessary to prevent hypoxia in the user for a given oxygen concentration and altitude. FIG. 6 shows a three-dimensional plot of an exemplary alarm flow rate surface. The flow rate is therefore said to be a function of the present oxygen concentration value and the present altitude value. The computerized alarm system computes 109 the alarm flow rate based on the received present oxygen concentration value and the received present altitude value. The present oxygen concentration value and the received present altitude value can be compared to the alarm flow rate surface.

The alarm flow rate may additionally be adjusted by a buffer value. The buffer value provides a safety factor in preventing hypoxia. As such, a system using a method according to embodiments of the present invention may avoid maintaining the user at the cusp of the threshold. Furthermore, a buffer value may account for differences in the breathing gas requirements of different users.

As mentioned above, the alarm flow rate is computed as a function of the present oxygen concentration and the present altitude. The function may be a polynomial. In some embodiments, the function may be a second-order polynomial, such as, for example, $Ax^2+Bx+C$, where x is the received present oxygen concentration value, and A, B, and C are functions of the received present altitude value. Thus, using this example, the alarm flow rate ("AFR")$=Ax^2+Bx+C$.

Similarly, any or all of A, B, and C, may be polynomials. For example, A, B, and/or C, may be represented by $D_{(A,B,C)}y^2+E_{(A,B,C)}y+F_{(A,B,C)}$, where y is the received present altitude value, and D, E, and F are constants. Thus, using this example polynomial, $A=D_A y^2+E_A y+F_A$; $B=D_B y^2+E_B y+F_B$; and/or $C=D_C y^2+E_C y+F_C$.

Figure 2:
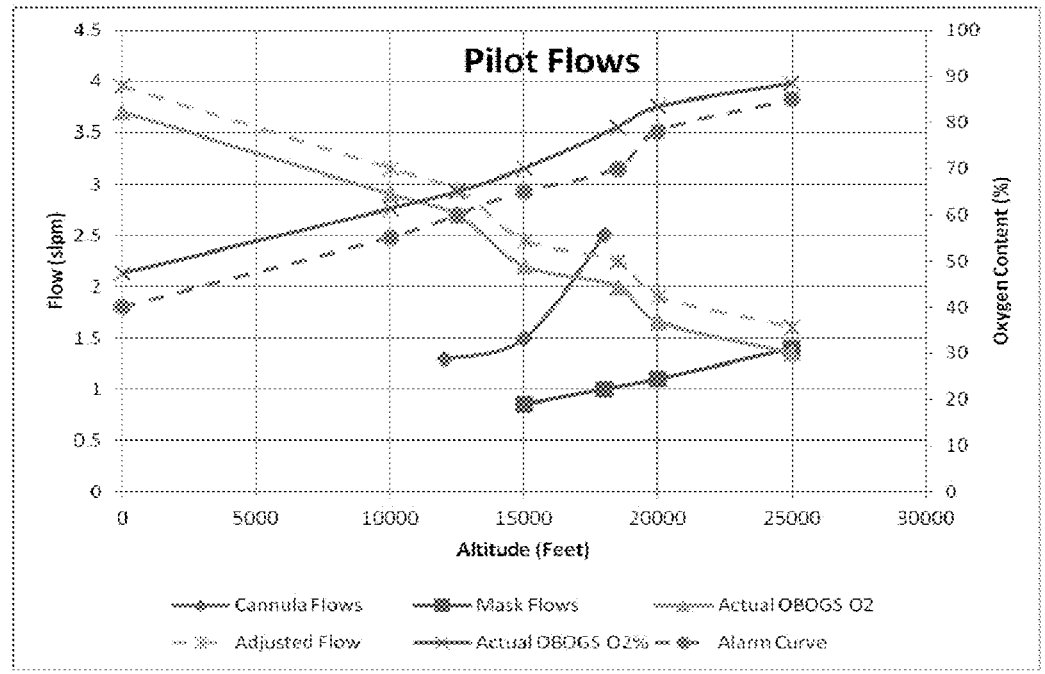
FIG. 2 is a graph showing pilot related test data measured in developing the exemplary function.

In an exemplary embodiment, test data was measured and recorded at various times during the development of a new breathing gas supply system. This test data is presented on the graphs of FIGS. 1 and 2 for passengers and pilots respectively. The test data is shown at different altitudes and with different acceptance criteria. The measured test data was compiled and evaluated to establish the threshold surface of the alarm flow rate. The resulting data is used to plot graphs and determine formulas that can be used to fill in gaps at any parameters between the measured data. The polynomial formula used was:

Flow$=Ax^2+Bx+C$. The chart of data shown in FIG. 3 was created to establish the curves that would allow calculation of the final formula (function).

Figures 3, 4:
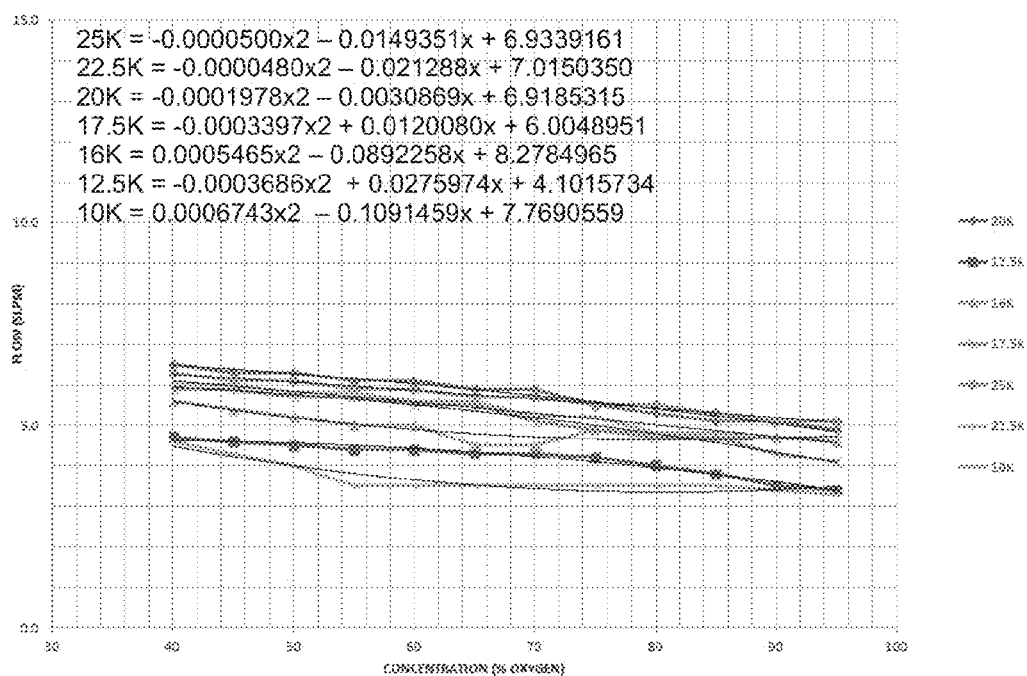
FIG. 3 is a chart of the test data measured in developing the exemplary function.
FIG. 4 is a graph showing concentration versus flow of the test data measured in developing the exemplary function.

The data was used to propagate the chart and the data was used to populate a spreadsheet. The resulting spreadsheet was used to plot curves for the flows and concentrations to determine the best fit formulas for those factors at each altitude as shown in FIG. 4. The trend line curves for the data plotted in FIG. 5 yields the following formulas for each altitude curve:

25K Feet Flow=0.0122857×% $OXY^2-$
2.3854286×% OXY+119.8100000

22.5K Feet Flow=0.0120000×% $OXY^2-$
2.2840000×% OXY+112.3300000

20K Feet Flow=0.0116327×% $OXY^2-$
2.1920408×% OXY+106.6663265

17.5K Feet Flow=0.0082119×% $OXY^2-$
1.5500138×% OXY+76.6609055

16K Feet Flow=0.0045000×% $OXY^2-$
0.9125000×% OXY+48.6375000

12.5K Feet Flow=0.0045000×% $OXY^2-$
0.8655000×% OXY+43.2375000

10K Feet Flow=0.0042986×% $OXY^2-$0.8122761×% OXY+38.7359418

Figure 5:
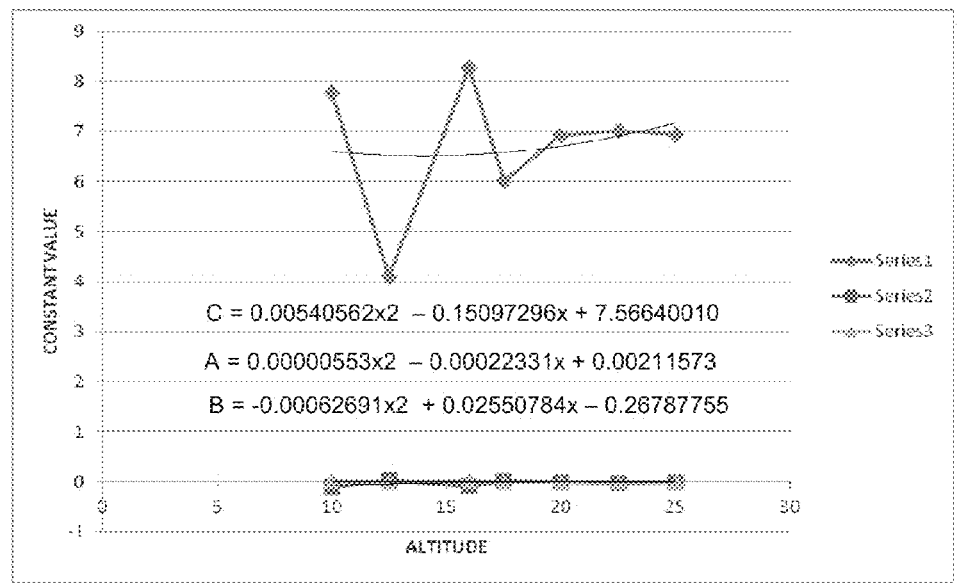
FIG. 5 is a graph showing a function of altitude used in developing the exemplary function.

The coefficients $f_A(ALT)$, $f_B(ALT)$, and $f_C(ALT)$ are then plotted in another spreadsheet and trend line formulas established to calculate the constants as shown in FIG. 5. The trend lines yield the following formulas for the constants $f_A(ALT)$, $f_B(ALT)$, and $f_C(ALT)$:

$$f_A = 0.0000097 \times ALT^2 + 0.0003157 \times ALT - 0.0006048$$

$$f_B = -0.0020708 \times ALT^2 - 0.0531003 \times ALT + 0.0602895$$

$$f_C = 0.09526317 \times ALT^2 + 2.93293885 \times ALT - 3.69941983$$

The formulas for the coefficients, being calculated using altitude (ALT) as the variable for the coefficients, are then inserted into the original polynomial formula, $Ax^2 + Bx + C$, with percent oxygen as the second variable, x, yielding the following formula for the lowest breathing gas flows needed to maintain the requisite blood saturation of oxygen in a human:

$$\text{Flow} = (0.0000097 \times ALT^2 + 0.0003157 \times ALT - 0.0006048) \times \%\ OXY^2 + (-0.0020708 \times ALT^2 - 0.0531003 \times ALT + 0.0602895) \times \%\ OXY + (0.09526317 \times ALT^2 + 2.93293885 \times ALT - 3.69941983).$$

This final surface formula was adjusted by a buffer value, as discussed earlier, to have a buffer zone just above the minimum human requirements yielding the following formula and surface plot shown in FIG. 6:

$$\text{Flow} = [(0.0000097 \times ALT^2 + 0.0003157 \times ALT - 0.0006048) \times (\%\ OXY - 5)^2 + (-0.0020708 \times ALT^2 - 0.0531003 \times ALT + 0.0602895) \times (\%\ OXY - 5) + (0.09526317 \times ALT^2 + 2.93293885 \times ALT - 3.69941983)] - 2.$$

The data calculated from this adjusted final formula used for the surface plot of FIG. 6 is shown in FIG. 7 for comparison to the original data collected during various manned testing to show all points are above the blood saturation requirements established during this exemplary clinical testing.

The method 100 may further comprise the step of receiving 112 a present flow value, where the present flow value represents the rate of flow of breathing gas to the user. The present flow value may be measured by a flow meter. The flow meter is in electrical communication with the computerized alarm system. The flow meter is configured to measure the rate of flow of breathing gas to the user. The measured value may be an instantaneous flow rate. In other embodiments, the value may represent an average rate of flow over a period of time. The measurement may be made continually at a sampling rate. The flow meter is configured to send an electrical signal representing the flow rate to the computerized alarm system. In this way, the flow meter sends the present flow value to the computerized alarm system, and the value is received 112 by the computerized alarm system.

The method 100 may further comprise the step of comparing 115 the calculated alarm flow rate to the received present flow value. The computerized alarm system compares 115 the alarm flow rate, calculated as described above, with the received present flow value, as measure by the flow meter. In this way, the computerized alarm system may determine the safe operation status of the oxygen system. In some embodiments, the computerized alarm system may generate an alarm. The alarm may be audible, visual, tactile, or any other method of alerting an appropriate party. In another embodiment, the computerized alarm system may send an electrical signal to the oxygen system. The signal may instruct the oxygen system to adjust the flow rate of breathing gas. The signal may instruct the oxygen system to adjust the oxygen concentration within the flow of breathing gas.

The steps of method 100 may repeat while the oxygen system of an aircraft is in use in order to monitor and adjust the breathing gas provided to the user. In this way, breathing gas may be more efficiently used. Efficient use of breathing gas may reduce operation costs and may provide better use of aircraft resources (e.g., lower weight and greater fuel efficiency due to less breathing gas carried on-board).

Figure 9:
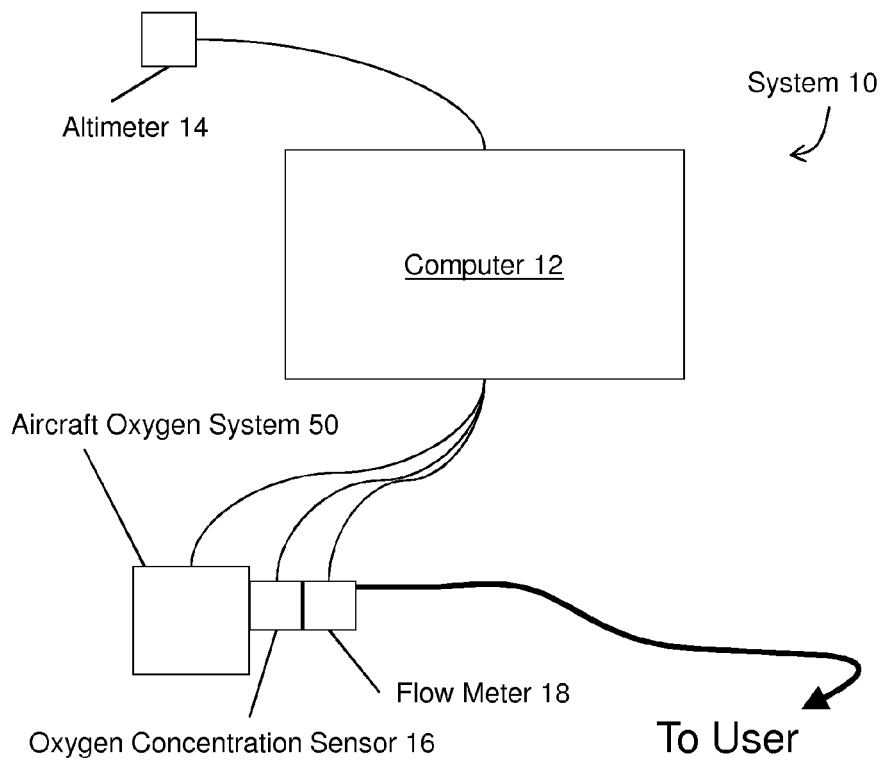
FIG. 9 depicts a system according to an embodiment of the present invention.

The present invention may be embodied as a system 10 for determining safe operation of an oxygen system 50 on an aircraft (see, e.g., FIG. 9). The system 10 comprises a computer 12. The computer 12 is in electrical communication with an oxygen concentration sensor 16, an altimeter 14, and a flow meter 18. In some embodiments, the oxygen concentration sensor 16, flow meter 18, and the altimeter 14 do not make up a part of system 10. For example, the altimeter 14 may be part of an avionics stack of an aircraft. The computer 12 is programmed to perform the aforementioned methods. For example, the computer 12 may be programmed to receive a present oxygen concentration value from the oxygen concentration sensor 16 and receive a present altitude value from the altimeter 14. The computer 12 may be programmed to compute an alarm flow rate as a function of the received present oxygen concentration value and the received present altitude value. The computer 12 may be further programmed to receive a present flow value from the flow meter and compare the calculated alarm flow rate to the received present flow value, to determine a safe operation status of the oxygen system 50.

Figure 10:
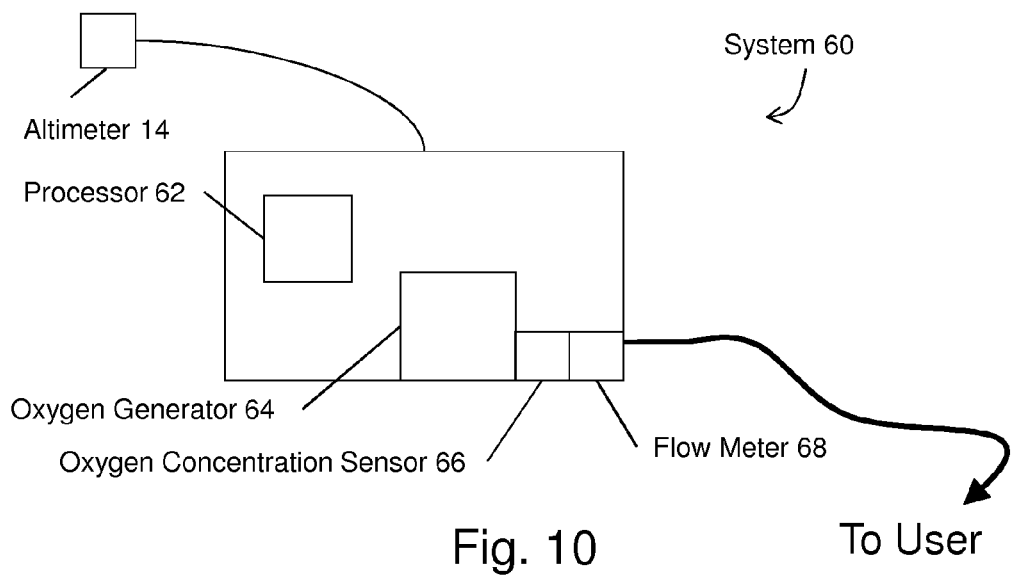
FIG. 10 depicts a system according to another embodiment of the present invention.

The present invention may be embodied as an oxygen system 60 for an aircraft—the aircraft having an altimeter 14 (see, e.g., FIG. 10). The oxygen system 60 comprises a processor 62. The oxygen system 60 further comprises an oxygen generator 64. The oxygen generator 64 is configured to provide a flow of breathing gas to the user. The oxygen generator 64 may be any type of oxygen generator suitable for a breathing system of an aircraft, including, without limitation, a pressurized bottle and regulator of pure oxygen, a pressure swing adsorption (PSA) generator, pressure swing vacuum swing adsorption (PSA/VSA) generator. The oxygen generator 64 may be configured with a selectively variable (adjustable) breathing gas flow rate and/or a selectively variable (adjustable) oxygen concentration. The oxygen generator 64 is in electrical communication with the processor 62.

The oxygen system 60 further comprises an oxygen concentration sensor 66 in electrical communication with the processor 62. The oxygen concentration sensor 66 is configured to measure an oxygen concentration of the breathing gas provided to the user. The oxygen system 60 comprises a flow meter 68 in electrical communication with the processor 62. The flow meter 68 is configured to measure the rate of flow of breathing gas to the user. The processor 62 is programmed to perform the aforementioned methods. For example, the processor 62 may be programmed to receive a present oxygen concentration value from the oxygen concentration sensor 66 and receive a present altitude value from the altimeter 14. The processor 62 may be programmed to compute an alarm flow rate as a function of the received present oxygen concentration value and the received present altitude value.

The processor 62 may be further programmed to adjust the flow rate of breathing gas to the user to a value according to the alarm flow rate. Alternatively, or additionally, the processor 62 may be further programmed to adjust the oxygen concentration of the breathing gas provide to the user to a value according to the alarm flow rate.

Although the present invention has been described with respect to one or more particular embodiments, it will be understood that other embodiments of the present invention may be made without departing from the spirit and scope of the present invention. There are numerous embodiments of the invention described herein including examples, all of which are intended to be non-limiting examples (whether explicitly described as non-limiting or not). Hence, the present invention is deemed limited only by the appended claims and the reasonable interpretation thereof.

What is claimed is:

1. A method of determining safe operation for a user of an aircraft oxygen system using a computerized alarm system, comprising:
   receiving a present oxygen concentration value of the oxygen system in the aircraft with the computer alarm system, the present oxygen concentration value received from an oxygen concentration sensor;
   receiving a present altitude value of the aircraft with the computer alarm system, the present altitude value received from an altimeter;
   computing, using the computer alarm system, an alarm flow rate as a function of the received present oxygen concentration value and the received present altitude value with the computer alarm system, the alarm flow rate corresponding to a flow of breathing gas flow sufficient to prevent hypoxia in the user at the present oxygen concentration value and the present altitude value;
   receiving a present flow value with the computer alarm system, the present flow value representing a rate of flow of breathing gas to the user, the present flow value being measured by a flow meter; and
   comparing, using the computer alarm system, the calculated alarm flow rate to the received present flow value, to determine a safe operation status;
   wherein the function is $Ax^2+Bx+C$, where x is the received present oxygen concentration value, and A, B, and C are functions of the received present altitude value.

2. The method of claim 1, wherein the alarm flow rate includes a buffer zone.

3. The method of claim 1, wherein each of A, B, and C are polynomials.

4. The method of claim 3, wherein each of A, B, and C are calculated using an equation $Dy^2+Ey+F$, where y is the received present altitude value, and D, E, and F are constants.

5. The method of claim 3, wherein:

$$A=0.0000097y^2+0.0003157y-00006048,$$

$$B=-0.0020708y^2-0.0531003y+0.0602895, \text{ and}$$

$$C=0.09526317y^2+2.93293885y-3.69941983; \text{ and}$$

where y is the received present altitude value.

6. The method of claim 5, wherein the function is adjusted by a buffer value, the buffer value creating a buffer zone in the alarm flow rate.

7. The method of claim 1, further comprising sending a signal to the oxygen system to adjust the rate of flow of breathing gas to the user according to the safe operation status.

8. The method of claim 1, further comprising sending a signal to the oxygen system to adjust an oxygen concentration of the breathing gas provided to the user based on the safe operation status.

9. The method of claim 1, wherein the steps of the method repeat.

10. A system for determining safe operation for a user of an oxygen system on an aircraft, comprising:
    a computer in communication with an oxygen concentration sensor, a flow meter, and an altimeter;
    wherein the computer is programmed to:
      receive a present oxygen concentration value from the oxygen concentration sensor;
      receive a present altitude value from the altimeter;
      compute an alarm flow rate as a function of the received present oxygen concentration value and the received present altitude value, the alarm flow rate corresponding to a flow of breathing gas sufficient to prevent hypoxia in the user at the present oxygen concentration value and the present altitude value;
      receive a present flow value from the flow meter, the present flow value representing a rate of flow of breathing gas to the user from the oxygen system; and
      compare the calculated alarm flow rate to the received present flow value, to determine a safe operation status;
      wherein the function is $Ax^2+Bx+C$, where x is the received present oxygen concentration value, and A, B, and C are functions of the received present altitude value.

11. The method of claim 10, wherein each of A, B, and C are polynomials.

12. The method of claim 11, wherein each of A, B, and C are calculated using an equation $Dy^2+Ey+F$, where y is the received present altitude value, and D, E, and F are constants.

13. The method of claim 12, wherein:

$$A=0.0000097y^2+0.0003157y-00006048,$$

$$B=-0.0020708y^2-0.0531003y+0.0602895, \text{ and}$$

$$C=0.09526317y^2+2.93293885y-3.69941983; \text{ and}$$

where y is the received present altitude value.

14. An oxygen system for an aircraft, the aircraft having an altimeter, comprising:
    a processor;
    an oxygen generator for providing a flow of breathing gas to a user, the oxygen generator being in communication with the processor, the oxygen generator having a selectively variable breathing gas flow rate and a selectively variable oxygen concentration;
    an oxygen concentration sensor in electrical communication with the processor, the oxygen concentration sensor configured to measure a concentration of oxygen in the flow of breathing gas;
    a flow meter in electrical communication with the processor, the flow meter configured to measure the rate of the flow of breathing gas; and
    wherein the processor is programmed to:
      receive a present oxygen concentration value from the oxygen concentration sensor;
      receive a present altitude value from the altimeter;
      compute an alarm flow rate as a function of the received present oxygen concentration value and the received present altitude value, the alarm flow rate corresponding to a flow of breathing gas sufficient to prevent hypoxia in the user at the present oxygen concentration value and the present altitude value;
      receive a present flow value from the flow meter; and
      compare the calculated alarm flow rate to the received present flow value, to determine a safe operation status;
      wherein the function is $Ax^2+Bx+C$, where x is the received present oxygen concentration value, and A, B, and C are functions of the received present altitude value.

15. The oxygen system of claim 14, wherein the processor is further programmed to vary the breathing gas flow rate of the oxygen generator and/or the oxygen concentration of the oxygen generator.

\* \* \* \* \*